May 4, 1965
L. S. LACY ETAL
3,182,222
HUMIDITY COMPENSATED THERMOSTAT
Filed June 13, 1962
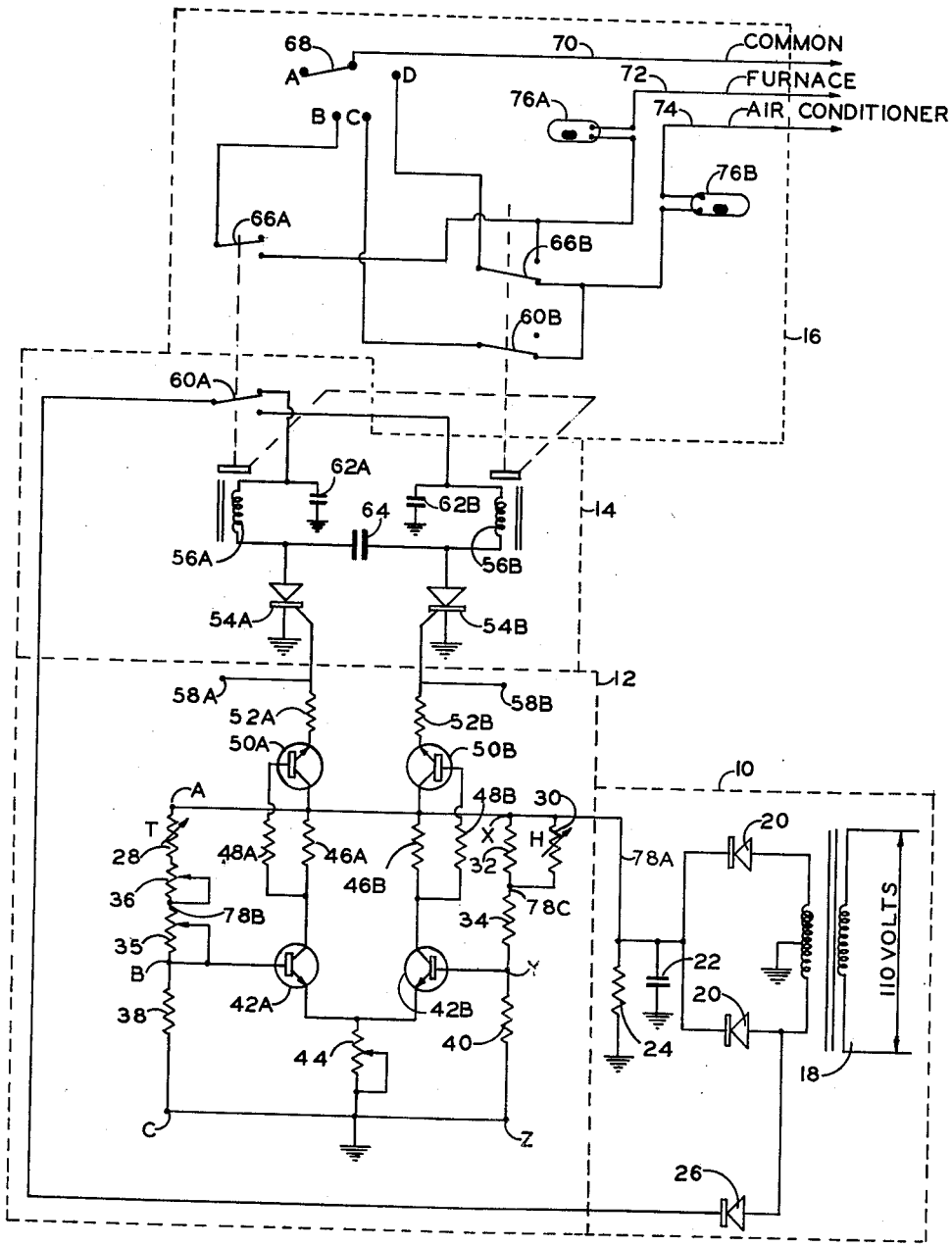
INVENTORS
LEWIS S. LACY &
JIMMIE L. MOON
BY
*Head & Johnson*
ATTORNEYS

United States Patent Office 3,182,222
Patented May 4, 1965

3,182,222
HUMIDITY COMPENSATED THERMOSTAT
Lewis S. Lacy, 4038 E. 23rd St., and Jimmie L. Moon,
5976 E. King Place, both of Tulsa, Okla.
Filed June 13, 1962, Ser. No. 202,110
1 Claim. (Cl. 317—148.5)

This invention relates to a humidity compensated thermostat. More particularly, this invention relates to a balanced transistorized circuit insensitive to ambient temperatures operable to control devices for the maintenance of predetermined temperature and humidity comfort levels.

It has long been recognized that temperature is not the only factor which effects environmental comfort. The body reacts physiologically to temperature of air through the body's normal temperature adjusting mechanisms which consist primarily in the excretion by the skin of perspiration whereby body temperature is maintained. When the human body becomes warm, greater amounts of perspiration are excreted, the evaporation of which lowers the body temperature. Even at the coldest temperature, still some skin moisture exists.

At a given temperature, say 75°, the environmental comfort level may be too warm or too cold depending upon the humidity. At 75°, if the humidity is very high, which retards the evaporation of body moisture, the average person will normally find the environmental temperature too warm. On the other hand, at 75° with a very low humidity, which tends to accelerate evaporation of body moisture and thereby producing a cooling effect, the average person will normally find the temperature too cold for maximum comfort. Thus, it is possible to accurately control environmental comfort only by interrelating the effect of both temperature and humidity.

Most temperature controls, especially of the type used in homes and even in some buildings and factories, regulate only the temperature and ignore the humidity level. This means that as the humidity changes occupants may become either too hot or too cold even though the temperature of the room remains the same.

Others have designed humidity compensated thermostats but such designs have to this date not been completely satisfactory, and for this reason humidity regulated thermostats have not been widely used. Some have attempted to utilize electronic circuits for more accurate and instantaneous response to environmental changes. When such circuits are composed primarily of vacuum tube elements, the continuous power consumption becomes an economic burden which cannot be justified in most installations. When semi-conductor devices have been utilized in such electronic circuits, the problem of excessive power consumption has been solved but semi-conductors are inherently temperature sensitive so that the construction of stable circuits which will compensate both for temperature and humidity have not resulted.

It is therefore an object of this invention to provide a humidity compensated thermostat.

Another object of this invention is to provide a humidity compensated thermostat which instantaneously reacts to environmental changes of both temperature and humidity and which is not unstable due to temperature variations of the circuit components.

Another object of this invention is to provide a balanced semi-conductor circuit using low power consuming devices providing comfort level control as affected by temperature and humidity in a manner such that the circuit itself is not affected by temperature changes.

Another object of this invention is to provide a humidity compensated thermostat having greatly improved sensitivity and reduced reaction time compared to existing thermostats.

Another object of this invention is to provide a humidity compensated thermostat which is relatively inexpensive to construct, which is composed of a minimum number of components and which is relatively maintenance free.

These and other objects and a better understanding of the invention may be had by referring to the following description and claim taken in conjunction with the attached drawing in which:

The single figure is a schematic diagram of the humidity compensated thermostat of this invention.

This invention may be defined as a humidity compensated thermostat. More particularly, but not by way of limitation, the invention may be defined as a humidity compensated thermostat comprising, in combination, a temperature sensing element, said temperature sensing element having an electrical resistance variable by the ambient temperature in which said element is positioned, a humidity sensing element, said humidity sensing element having an electrical resistance variable with the ambient humidity in which said element is positioned, means of applying a voltage across each of said temperature and said humidity sensing elements whereby current flow through each of said elements is proportional to the resistance of said elements, and current differential detecting means whereby current flow differentials through said temperature and said humidity elements is detected.

The circuit diagram of the figure may be divided into four basic portions or functions which, for purposes of description, are enclosed in dotted lines. The portions of the circuit are: a power supply 10; a differential amplifier 12; a switching circuit 14; and a furnace and air conditioner control circuit 16. As will be understood from further description of the humidity compensated thermostat of this invention, various portions of the circuit may be replaced by other devices, the portions set forth herein are to demonstrate an integrated functional application of the thermostat of this invention.

The power supply 10 may be considered somewhat conventional. The power supply, by means of a transformer 18 isolates the circuit and provides a reduced output voltage. Rectifiers 20 provide a D.C. voltage which is filtered by condenser 22. A fairly low value bleeder resistor 24 aids in the power supply regulation. A separate rectifier 26 is utilized to provide a relay voltage for a purpose set forth hereinafter.

It is understood that the power supply 10 of this invention is merely exemplary and any power supply providing the required direct current voltage and having a suitable regulation would be within the purview of this invention.

The most significant portion of the figure is the differential amplifier portion 12. Temperature is detected by a thermistor 28. Thermistors, which are readily commercially available, are devices having a high negative temperature coefficient of resistance. The thermistor utilized in practical embodiments of the invention has a negative temperature coefficient of resistance of approximately 4.4 percent per degree centigrade.

Humidity is detected by a humidity sensing element 30. Any such element having a humidity coefficient of resistance will function according to the principles of this invention.

As has been previously set forth, environmental comfort is a factor of both temperature and humidity. According to the principles of this invention the temperature as detected by thermistor 28, and humidity, as detected by humidity sensing element 30, are utilized in the differential amplifier circuit 12 to provide a signal to effect a switching action in order to maintain the proper comfort zones as temperature and humidity vary.

Shunt resistors 32 and 34 are utilized in parallel and series with the humidity sensing element 30 to give the desired effect on the differential amplifier 12. The values of such shunt resistors 32 and 34 will be determined by the other components in the circuit.

In series with thermistor 28 is a calibrating control rheostat 35 which may be used to calibrate the thermostat and which may also be used to compensate for circuit tolerances in manufacturing processes. In series with thermistor 28 and calibrating rheostat 35 is a comfort zone control rheostat 36 which functions in a manner which will be described subsequently. The rheostat 36 is termed a comfort zone control rather than a temperature control because, by the provisions of this invention, a person setting the control 36 sets a level of comfort and not a level of temperature, that is, the selected level will have a varying dry bulb temperature according to the humidity level. This is the essential distinction between the humidity compensated thermostat of this invention and the standard thermostat.

Humidity sensing element 30 and shunting resistors 32 and 34 are selected so as to give a one degree temperature change for each eight percent increase or decrease in humidity. Biasing divider resistors 38 and 40 provide proper biasing for the differential amplifier 12.

A first and second transistor 42A and 42B are provided to react to the detected variations in the resistance of the thermistor 28 and the humidity sensing element 30. Rheostat 44 has two functions. First, it couples, by means of bias change, any increase in current flow through transistor 42A or 42B to the other, having a negative biasing effect and thereby giving a differential action to transistors 42A and 42B. This function may be described as a bias differential coupling function. The second function of rheostat 44 is to serve as a sensitivity control by the adjustment of the bias between the transistor emitter and base.

Current flow through transistor 42A is detected by the voltage drop across load resistor 46A and similarly, the value of current flow through transistor 42B is reflected in the voltage drop across load resistor 46B. By means of current limiting resistors 48A and 48B, the voltage across load resistors 46A and 46B are coupled to transistors 50A and 50B. Transistors 50A and 50B function primarily to match impedances. The output of transistors 50A and 50B, each of which function as an emitter follower, are coupled through current limiting resistors 52A and 52B to the gates of silicon controlled rectifiers 54A and 54B. Silicon controlled rectifiers 54A and 54B are connected in series with relays 56A and 56B.

It will be noted that relays 56A and 56B are latched together so that when relay 56A is closed it will not open, regardless of change of current flow through silicon controlled rectifier 54A, until silicon controlled rectifier 54B fires to energize relay 56B, and vice versa. In other words, by the provisions of switching circuit 14 as shown in the figure, either relay 56A or relay 56B will be closed at all times, and in no event will both relays be closed or both relays open.

Shown extending from the output of emitter follower 50A is an output post 58A and likewise shown at the output of emitter follower 50B is an output post 58B. By means of such output posts 58A and 58B the function of the differential amplifier 12 may be utilized for purposes other than for controlling the switching circuit 14, which is, although the preferred embodiment of the humidity compensated thermostat of this invention, nevertheless exemplary of the application of the use of the differential amplifier 12.

With the comfort zone control rheostat 36 set at a predetermined level, an increase in the environmental temperature will reduce the resistance of thermistor 28, which increases the voltage drop across biasing resistor 38 and, in effect, increases the bias on the transistor 42A. This increase in bias on transistor 42A increases current flow through its collector circuit and thus current flow through rheostat 44 which in turn decreases the effective bias on transistor 42B. Assuming the humidity has not changed with the temperature change, the resistance of humidity sensing element 30 will remain constant so that the only biasing change in transistor 42B is that reflected by the increase of current flow through rheostat 44. This decreases the biasing of transistor 42B, causing it to conduct less. With sufficient temperature increase of thermistor 28 the decreased current flow through transistor 42B is reflected to emitter follower transistor 50B which will cause silicon controlled rectifier 54B to fire, and, if relay 56B has previously been opened, will cause relay 56B to close.

The same effect is accomplished by increasing the humidity, or in effect increasing the resistance of humidity sensing element 30. In other words, since increasing the effect of temperature or increasing the relative humidity have the same detrimental effect on a predetermined comfort zone each has the same effect of raising silicon controlled rectifier 54B to the firing point.

In contrast, if temperature diminishes, the resistance of thermistor 28 increases, reducing biasing of transistor 42A so that it will have a tendency to conduct less, which change in state is transmitted to the silicon controlled rectifier 54A causing it to conduct. The same effect will occur by the reduction of humidity as detected by humidity sensing element 30. Since decreasing temperature effects a preselected comfort zone in the same way as decreasing humidity, the results in the differential circuit 12 are the same, except that the proportional effect of the results of temperature and humidity changes are established by the circuit values in such a way that an eight percent increase or decrease in humidity has the same effect as a one degree decrease or increase in temperature in conformity with the established standards that temperature and humidity are so interrelated in the establishment of environmental comfort.

The differential amplifier 12 is shown with the preferred embodiment utilizing a thermistor 28 having a negative coefficient of resistance and a humidity sensing element 30 having a positive coefficient of resistance, in which case the thermistor 28 is positioned between points A and B in the circuit and the humidity sensing element 30 is positioned between points X and Y, while the resistances between points B and C and between Y and Z remain constant. It can be seen that many variations can be made in the principle of the circuit of the figure. For instance, if a humidity sensing element 30 is utilized having a negative coefficient of humidity, such element may be placed in the circuit between points Y and Z with the resistance between points X and Y remaining constant, or a humidity sensing element of such negative resistance characteristic may be placed in a parallel arrangement with thermistor between points A and B. Similarly, a thermistor 28, or other temperature detecting device, having a positive temperature coefficient of resistance can be placed between points B and C in the circuit or parallel with humidity sensing element 30 between points X and Y. Thus, many alternate circuit arrangements may be made within the principle of the invention and since such alternate arrangements are within the skill of any knowledgeable electrical engineer such are within the purview of this invention.

The outputs of emitter followers 50A and 50B are used to control some type of differential detecting means. In the circuit of the figure the outputs of silicon controlled rectifiers 54A and 54B are utilized to control latched relays 56A and 56B, but as previously mentioned, the outputs may be taken from output posts 58A and 58B and utilized to control other devices which are commonly used in heating and cooling systems for comfort control. One example of the use of outputs from output posts 58A and 58B would be the utilization of such voltages to control pneumatic systems, such as the utilization of such voltages to control a pilot forced balanced pneumatic valve unit such as Minneapolis-Honeywell's pneumatic valve unit No. RO7902. Those experienced in temperature control systems will recognize that the output voltages available at output posts 58A and 58B may be used for many applications in controlling temperature regulating mechanisms.

The preferred embodiment, however, for utilizing the output voltages of the differential amplifier 12 is a switching circuit 14. As previously indicated, silicon controlled rectifier 54A is in series with a relay 56A and similarly, silicon controlled rectifier 54B is in series with a relay 56B. Relay 56A is provided with a single pole double throw relay contact 60A and likewise relay 56B is provided with a single pole double throw relay contact 60B. Contact 60A of relay 56A controls which of the silicon controlled rectifiers 54A or 54B will have a voltage thereacross. When contact 60A is in the downward position, voltage is placed across relay 56B and silicon controlled rectifier 54B. When contact 60A is in the upward position voltage is placed across relay 56A and silicon controlled rectifier 54A. Thus, with contact 60A in the downward position only relay 56B is capable of energization and conversely, when relay contact 60A is in the upward position only relay 56A is capable of energization. The relays, as previously indicated, are latched together so that when relay 56A energizes it is latched in the energized position and will not revert to the deenergized position until relay 56B energizes and conversely, relay 56B can move into the deenergized or upward position only when relay 56A energizes.

Placed in parallel with relay 56A is a capacitor 62A and similarly, capacitor 62B is in parallel with relay 56B. Assuming conductivity of emitter follower transistor 50A increases to the point so that sufficient voltage is applied to the gate of silicon controlled rectifier 54A, causing it to conduct, and further assuming that relay contact 60A is in the upward position applying a voltage to relay 56A, as soon as the silicon controlled rectifier 54A conducts energizing relay 56A, the movement of its armature will start, and relay contact 60A will move to the open position. So just as relay 56A starts to move, energization power is taken away from it. Capacitor 62A, being subjected to voltage across the relay 56A, is charged. By the discharge of capacitor 62A, complete closing of relay 56A is achieved even though contact 60A opens just as energization starts. In the same manner capacitor 62B insures the complete closing of relay 56B when silicon controlled rectifier 54B fires.

Capacitor 64 positioned between the anodes of silicon controlled rectifiers 54A and 54B provides a means of making certain that both of the silicon controlled rectifiers will not fire at the same time. When one of the silicon controlled rectifiers 54A or 54B fires, capacitor 64 conveys a negative voltage pulse to the anode of the other silicon controlled rectifier to prevent it from firing.

It can be seen that by the circuit of the figure a differential current applied to the gates of the silicon controlled rectifiers 54A and 54B will switch latching relays 56A and 56B back and forth. Relay contact 60B may be utilized to control heating or cooling facilities which regulate the temperature in which the thermistor 28 and the humidity sensing element 30 are positioned.

Although the switching of relay contact 60B alone may be utilized in a multitude of ways to achieve comfort level control a preferred embodiment is shown in the invention in the furnace and air conditioning control circuit 16. In this arrangement an additional single pole double throw contact 66A is actuated by relay 56A and similarly, an additional single pole double throw contact 66B is actuated by relay 56B. A selector switch 68 is provided with four positions. Position A is an off position in which the common conductor 70 is not connected to anything regardless of the attitude of the balance of the circuit arrangement of the figure. In position A neither furnace nor air conditioning will come into effect regardless of any changes in the circuit.

Position B of selector switch 68 is the heating position. With selector switch 68 in position B and relay contact 66A in the downward position, furnace conductor 72 presents a closed circuit with common conductor 70 to initiate a heating cycle in furnace equipment. With selector switch 68 in position B opening relay contact 66A opens the circuit to present an open circuit to furnace equipment.

Position C of selector switch 68 is utilized to control air conditioning and presents a closed circuit between air conditioning control conductor 74 and common conductor 70 when relay contact 60B is in the downward position and conversely presents an open circuit when relay contact 60B is in the upward position. In this manner the circuit may be utilized to control the activation of air conditioning equipment according to the resistances reflected by thermistor 28 and humidity sensing element 30.

Position D of selector switch 68 provides control of both furnace and air conditioning according to the position of relay contact 66B so that upon lowering temperature below a level selected by comfort zone rheostat 36 furnace conductor 72 presents a closed circuit with common conductor 70 and upon rising temperature, above a preselected range as determined by the setting of comfor zone control rheostat 36, air conditioning conductor 74 presents a closed circuit with common conductor 70.

An additional embellishment of the furnace and air conditioning control circuit 16 of the figure includes the provision of outside air temperature switches 76A and 76B. These outside air temperature switches 76A and 76B may be of any type but are preferably of the mercury switch type and are exposed to the outside temperature of the building or enclosure utilizing the humidity compensated thermostat of the figure. Outside temperature switch 76A opens when the temperature is above a predetermined point in order to prevent a furnace controlled by conductors 70 and 72, from being energized to provide heat. Conversely, outside temperature switch 76B opens when the temperature is below a predetermined point. Even though selector switch 68 is in position C, air conditioning conductor 74 cannot reflect a closed circuit with common conductor 70 when the outside air temperature is below the point at which switch 76B opens.

The thermistor 78, functioning as a temperature sensing element, and the humidity sensing element 30 are shown integrally formed in the circuit of the figure. Many applications will require that the main circuit of the thermostat be located at a point other than at the place where the sensing elements 28 and 30 are located. By the use of only three conductors 78A, 78B and 78C, it can be seen that the temperature and humidity sensing elements 28 and 30 can be very easily remotely located from the balance of the circuit making up the thermostat of this invention. Since the voltages required in the circuit are very low, a practical embodiment of the invention requiring only 18 volts on conductor 78A, all of the conductors 78A, 78B, and 78C may be of a small current carrying capacity and small voltage capacity obviating the requirement of most electrical codes that they be in any sort of protective raceway. Thus sensing elements 28 and 30 may be very remotely located.

This invention sets forth a humidity compensated thermostat providing a circuit utilizing inexpensive components in a stable arrangement wherein comfort level as reflected by both temperature and humidity is controlled in one instrument. By the novel provisions of this thermostat, the device is not affected by ambient temperatures since the circuit is balanced. In addition, the elements making up the thermostat are relatively inexpensive and readily available. The power consumption is exceedingly small and all of the components are of the type having long life and are of a characteristic to be trouble free.

Although this invention has been described with a certain degree of particularity, it manifests that many changes may be made in the details of construction and the arrangement of components without departing from the spirit and scope of this disclosure.

We claim:

A humidity compensated thermostat, comprising, in combination:

- a temperature sensing element having a resistance variable with the temperature of said element;
- a humidity sensing element having a resistance variable with the environment humidity in which said element is positioned;
- a first transistor amplifying means having a voltage thereacross;
- a first biasing resistor means in series with said temperature sensing element, said temperature sensing element and said first biasing resistor means having a voltage impressed thereacross whereby voltage across said first biasing resistors is proportional to resistance of said temperature sensing element, said first biasing resistor means coupled to said first transistor means to control current flow through said first transistor means;
- a second transistor amplifying means having a voltage thereacross;
- a second biasing resistor means in series with said humidity sensing element, said humidity sensing element and said second biasing resistor means having a voltage impressed thereacross whereby voltage across said second biasing resistor is proportional to resistance of said humidity sensing element, said second biasing resistor means coupled to said second transistor means to control current flow through said second transistor means;
- differential detecting means operable by relative current flow through said first and second transistor means; and
- bias differential coupling means between said first and said second transistor.

References Cited by the Examiner
UNITED STATES PATENTS

| 2,413,128 | 12/46 | Wills | 317—153 X |
| 2,828,464 | 3/58 | Nixon et al. | 236—44 X |
| 2,974,870 | 3/61 | Pitts | 236—44 |

FOREIGN PATENTS

| 1,245,376 | 9/60 | France. |

SAMUEL BERNSTEIN, *Primary Examiner.*